United States Patent [19]

Penney

[11] Patent Number: 5,515,112
[45] Date of Patent: May 7, 1996

[54] CHROMINANCE TRANSITION CORRECTOR

[75] Inventor: Bruce J. Penney, Beaverton, Oreg.

[73] Assignee: Tektronix, Inc., Wilsonville, Oreg.

[21] Appl. No.: 357,884

[22] Filed: Dec. 19, 1994

[51] Int. Cl.$^6$ .................................................. H04N 9/64
[52] U.S. Cl. ................................. 348/630; 348/631
[58] Field of Search .......................... 348/630, 631, 348/625, 644, 645, 662, 712, 713, 711, 710, 912; 358/39, 40, 166, 35, 37, 38, 27; 382/167, 162; H04N 9/68, 9/77, 9/64

[56] References Cited

U.S. PATENT DOCUMENTS 4,812,905   3/1989   Rossi ............................. 348/630

*Primary Examiner*—James J. Groody
*Assistant Examiner*—Sherrie Hsia
*Attorney, Agent, or Firm*—Francis I. Gray

[57] ABSTRACT

A chrominance transition corrector for restoring chrominance transitions after they have been degraded by a limited bandwidth channel converts input luminance and chrominance components, which represent a video image, from the time to the frequency domain. Correction coefficients are determined from a low frequency portion of the converted luminance component and the converted chrominance components. Corrected high frequency portions of the chrominance components are generated from the correction coefficients and a high frequency portion of the converted luminance component. The resulting converted and corrected high frequency portion of the chrominance components are then converted back to the time domain to produce chrominance output components, the chrominance transitions having been corrected.

6 Claims, 10 Drawing Sheets

CHROMINANCE TRANSITION CORRECTOR

BACKGROUND OF THE INVENTION

The present invention relates to color correction, and more particularly to a chrominance transition corrector for restoring chrominance transitions after they have been degraded by a limited bandwidth channel.

In typical television video images, chrominance transitions from one color to another are matched to luminance transitions. After passing through a bandwidth limited channel with less chrominance bandwidth than luminance bandwidth, the chrominance transitions may no longer match the luminance transitions. The resulting loss of chrominance resolution degrades picture quality and also causes problems in chroma keying, which depends on chrominance detail to generate control or key signals.

Some previous approaches to improving chrominance sharpness have used peaking circuits, which speed up transitions. A flaw of this approach is that even those transitions which are supposed to be slow are speeded up. This results in inaccurate renditions of picture detail.

What is desired is a chrominance transition corrector that restores chrominance transitions to match luminance transitions after the chrominance transitions have been degraded by a bandwidth limited channel.

SUMMARY OF THE INVENTION

Accordingly the present invention provides a chrominance transition corrector that converts the chrominance and luminance component signals, which represent a video image, from the time domain to the frequency domain and separates the high and low frequency portions of each component signal. The respective low frequency chrominance portions are each combined with the low frequency luminance portion to generate a correction coefficient for each chrominance component. The correction coefficients are multiplied by the high frequency luminance portion to produce corrected high frequency chrominance portions. The corrected high frequency chrominance portions are combined with the respective low frequency chrominance portions to produce corrected chrominance components. The luminance component and corrected chrominance components are then converted back to the time domain for display or encoding into a composite video image.

The objects, advantages and other novel features of the present invention are apparent from the following detailed description when read in conjunction with the appended claims and attached drawing.

DESCRIPTION OF THE PREFERRED EMBODIMENT

Figure 1:
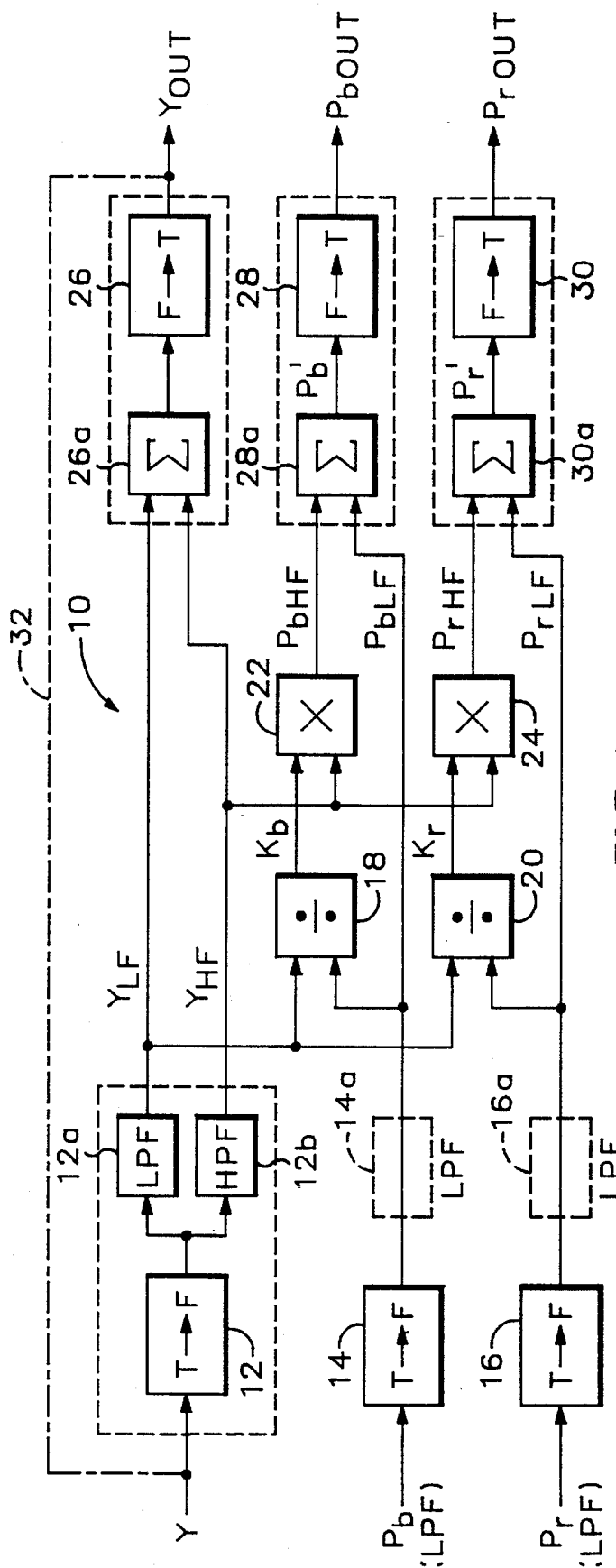
FIG. 1 is a block diagram view of a chrominance transition corrector according to the present invention.

Referring now to FIG. 1 a chrominance transition corrector 10 has as inputs a luminance component Y and two chrominance components $P_b$, $P_r$ which represent a video image. The luminance component is a wideband signal, while the chrominance components are bandwidth limited relative to the luminance component. The components are input to respective time to frequency domain converters 12, 14, 16. The output from the luminance time to frequency domain converter 12 is input to a pair of filters, a lowpass filter 12a and a highpass filter 12b that each provide a low frequency portion $Y_{LF}$ and a high frequency portion $Y_{HF}$ for the luminance component. Similar filtering may be done at the outputs of the chrominance time to frequency converters 14, 16, however only the low frequency chrominance component outputs are used. As is well known, the time to frequency domain conversion may be performed by a discrete Fourier transform (DFT), a discrete cosine transform (DCT) or other appropriate transform. In a typical application luminance Y may have a 4 Mhz bandwidth while chrominance Pb, Pr may have an 800 kHz bandwidth. In this case low frequency LF means below 800 kHz and high frequency HF means 800 kHz to 4 Mhz. The low frequency luminance portion $Y_{LF}$ is input to a pair of correction coefficient circuits 18, 20. One low frequency chrominance portion $P_{bLF}$ is input to one of the correction coefficient circuits 18, and the other low frequency chrominance portion $P_{rLF}$ is input to the other correction coefficient circuit 20 to produce a pair of correction coefficients $K_b$, $K_r$ according to the following equations:

$$K_b = P_{bLF}/Y_{LF}; K_r = P_{rLF}/Y_{LF}.$$

In this example the correction coefficient circuits 18, 20 may be divider circuits.

The pair of correction coefficients are input together with the high frequency luminance portion to a pair of multipliers 22, 24 to produce corrected high frequency chrominance portions $P_{bHF}$, $P_{rHF}$. The high and low frequency luminance portions and the low and corrected high frequency chrominance portions are combined by summation circuits 26a, 28a, 30a and input to respective frequency to time domain converters 26, 28, 30 to produce output luminance and chrominance components $Y_{out}$, $P_{bout}$, $P_{rout}$. Alternatively the input luminance component Y may be taken directly as the output luminance component, as shown by dotted line 32, eliminating the need for the luminance frequency to time converter 26. These output components may be displayed or encoded to form a composite video signal.

Figure 2:
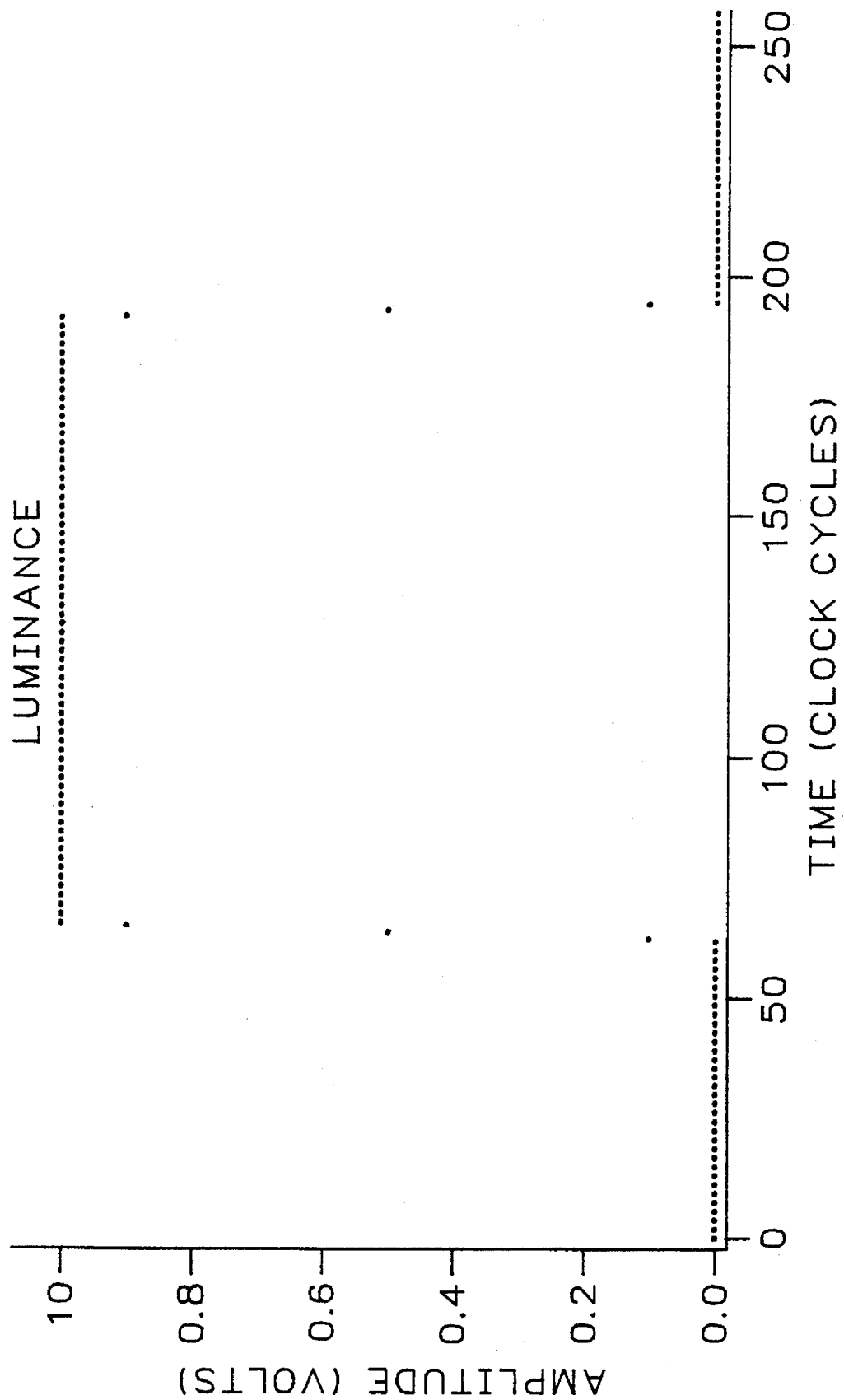
FIG. 2 is a graphic view of an illustrative luminance component waveform signal in the time domain.
Figure 3:
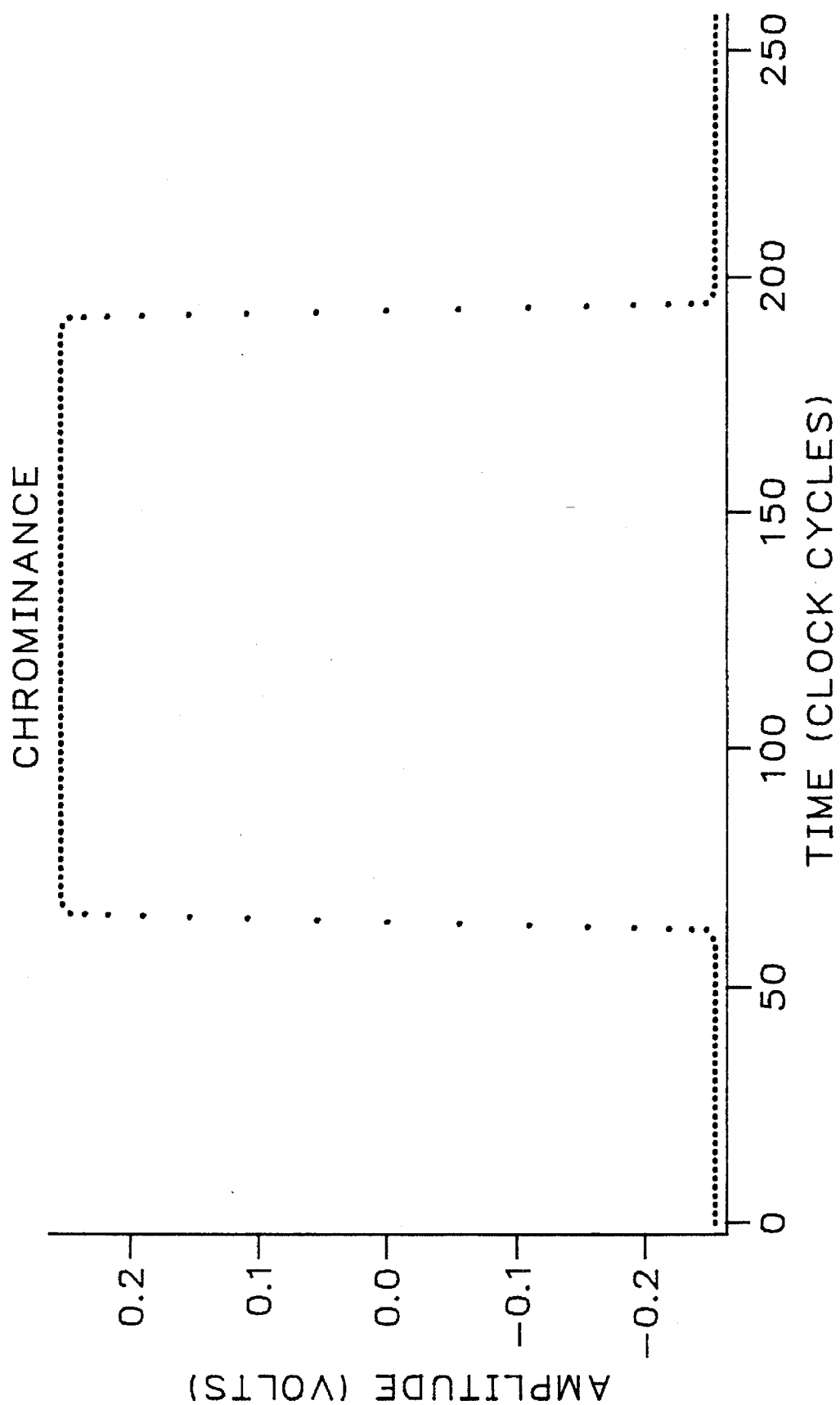
FIG. 3 is a graphic view of a corresponding illustrative chrominance component waveform signal in the time domain.
Figure 4:
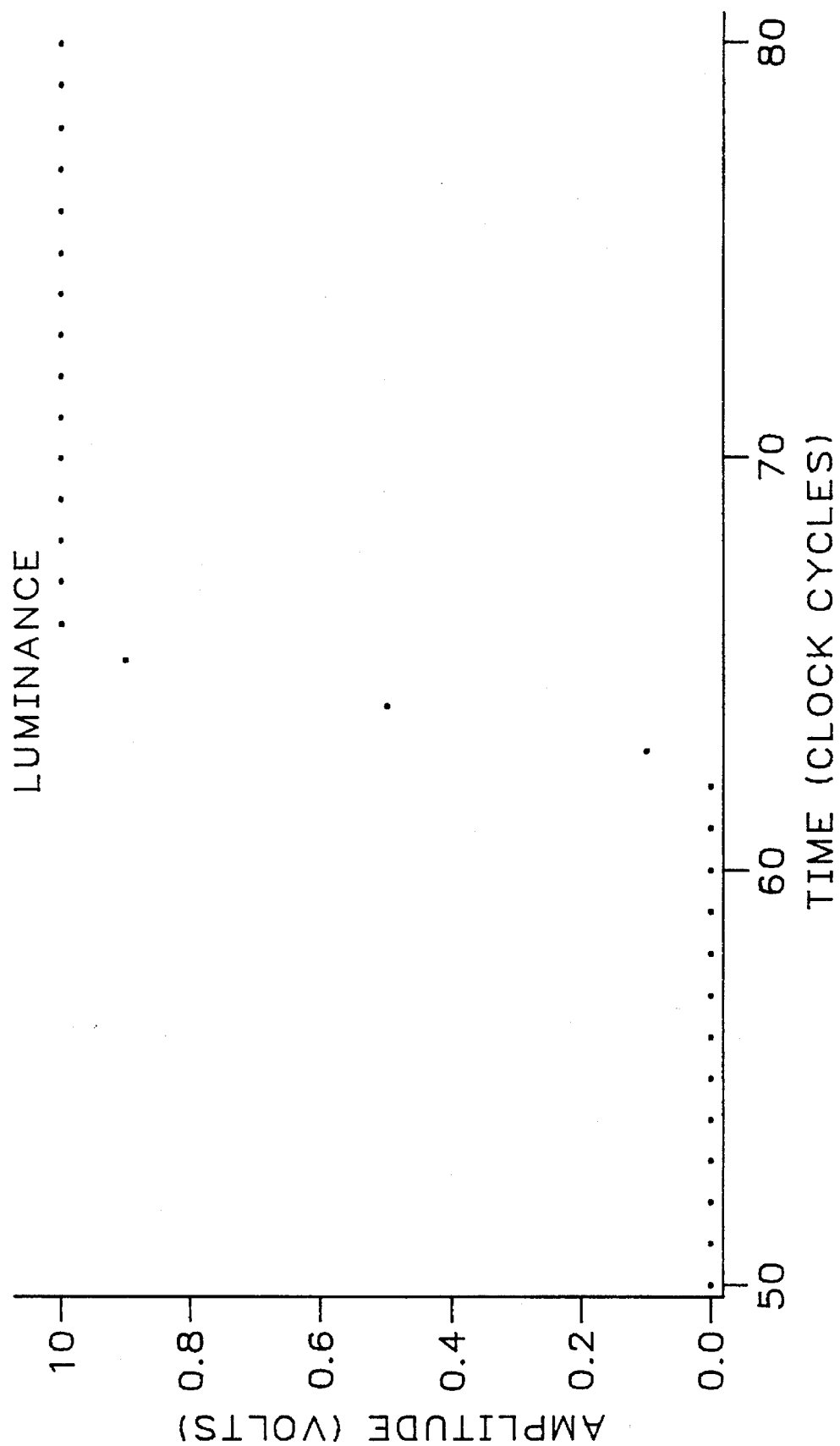
FIG. 4 is an expanded graphic view of a portion of FIG. 2.
Figure 5:
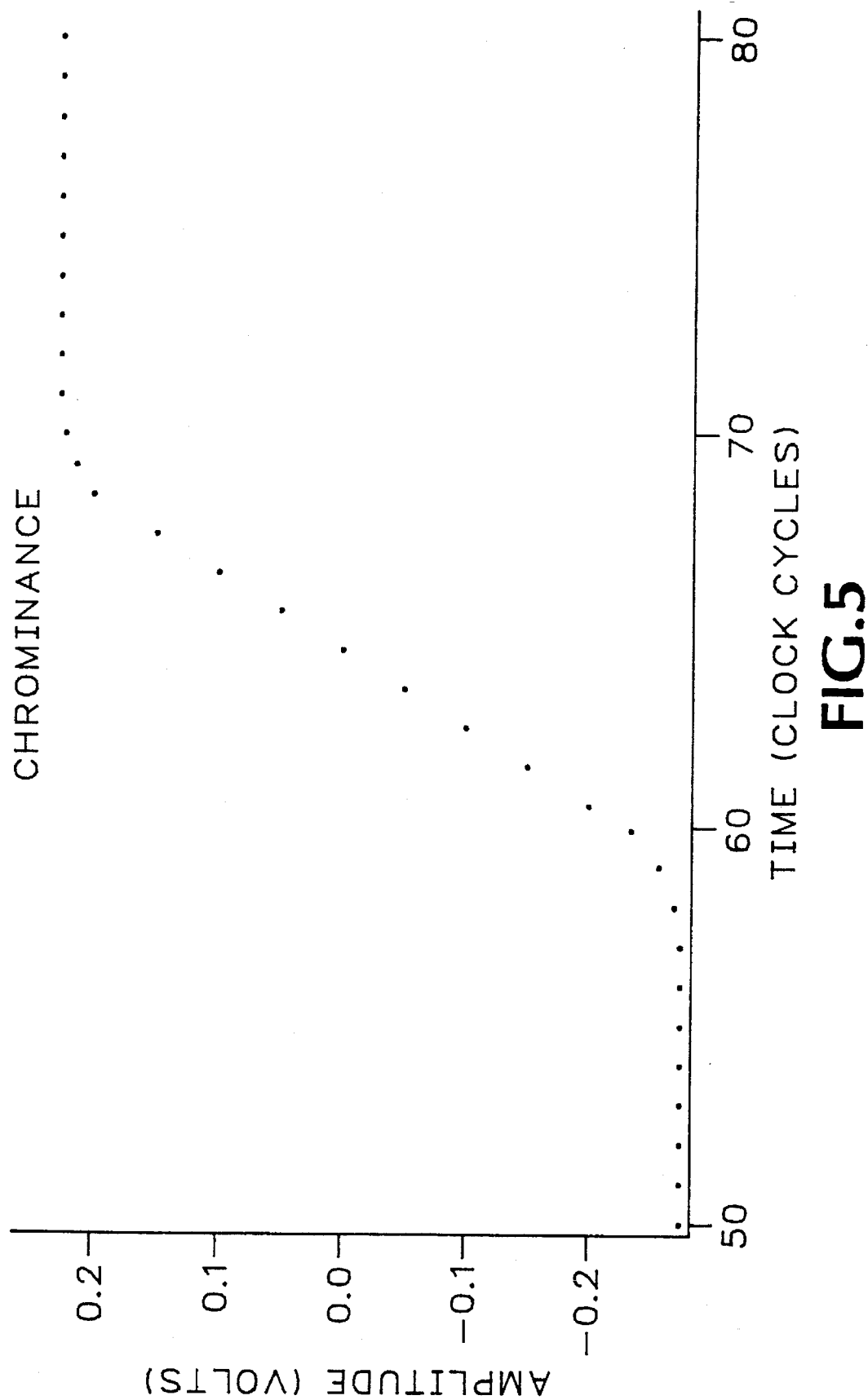
FIG. 5 is an expanded graphic view of a portion of FIG. 3.

As an illustration of the operation of the chrominance transition corrector 10 fast Fourier transform (FFT) circuits are used as the time to frequency converters 12, 14, 16. Normally an FFT function results in a complex spectrum in which two quadrature components, real and imaginary, are processed. However for the purpose of simplifying this illustration, the signal being processed has time symmetric luminance and chrominance waveforms, as shown in FIGS. 2 and 3, resulting in the imaginary components being zero, i.e., not being processed. FIG. 2 shows a representative luminance signal with a transition from 0 to 1 volt and a risetime of about 2 clock cycles. The associated chrominance signal has a transition from −0.25 to 0.25 volt and a risetime, as shown in FIG. 3, of about 8 clock cycles. Both waveforms are shown expanded in FIGS. 4 and 5.

Figure 6:
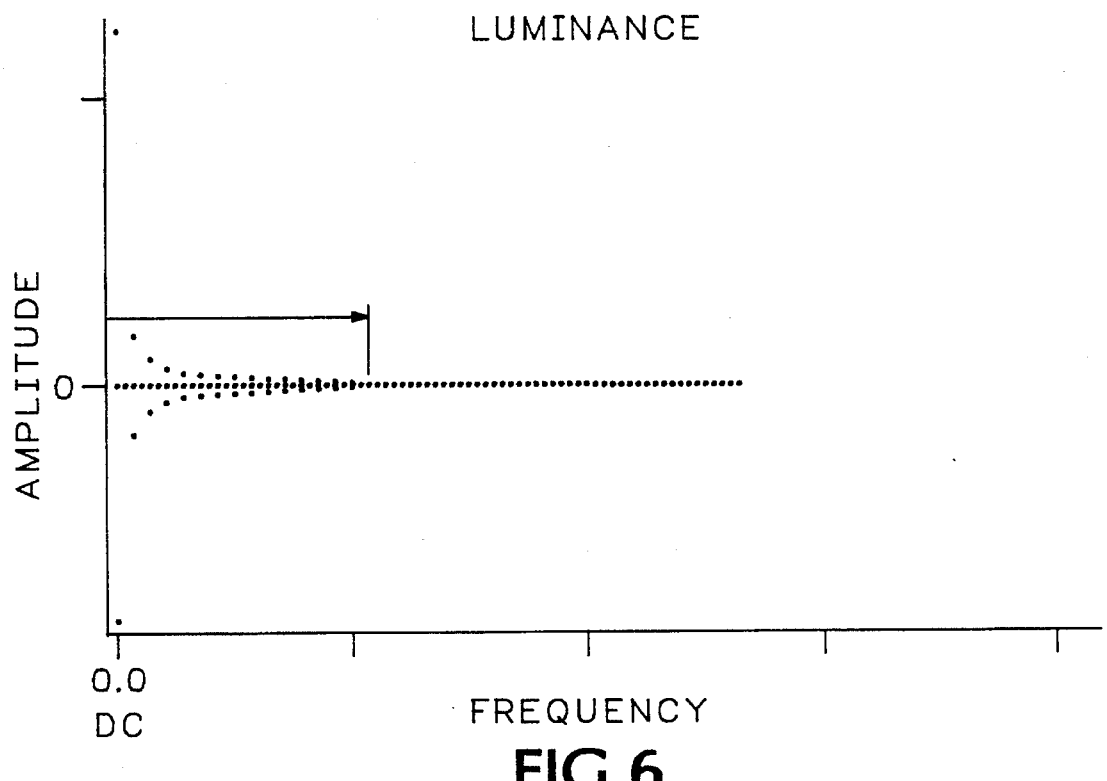
FIG. 6 is a graphic view of the luminance component signal of FIG. 2 in the frequency domain.
Figure 7:
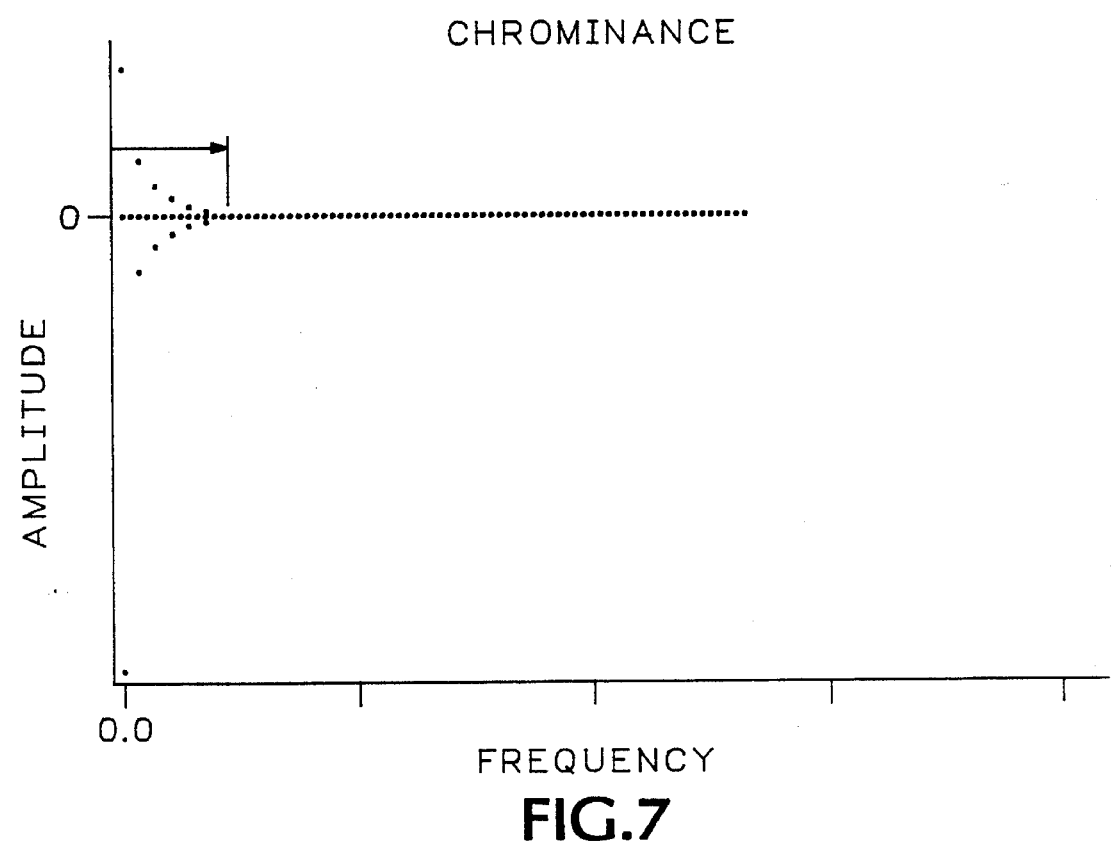
FIG. 7 is a graphic view of the chrominance component signal of FIG. 3 in the frequency domain.
Figure 8:
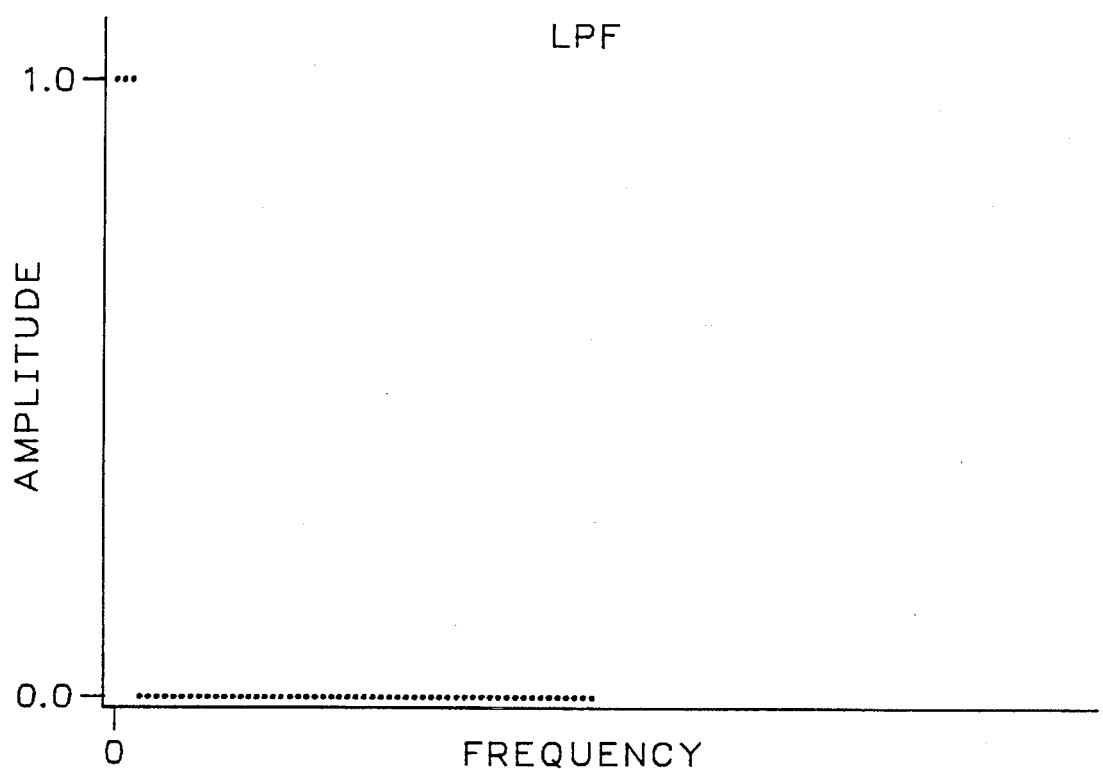
FIG. 8 is a graphic view of a lowpass filter characteristic.
Figure 9:
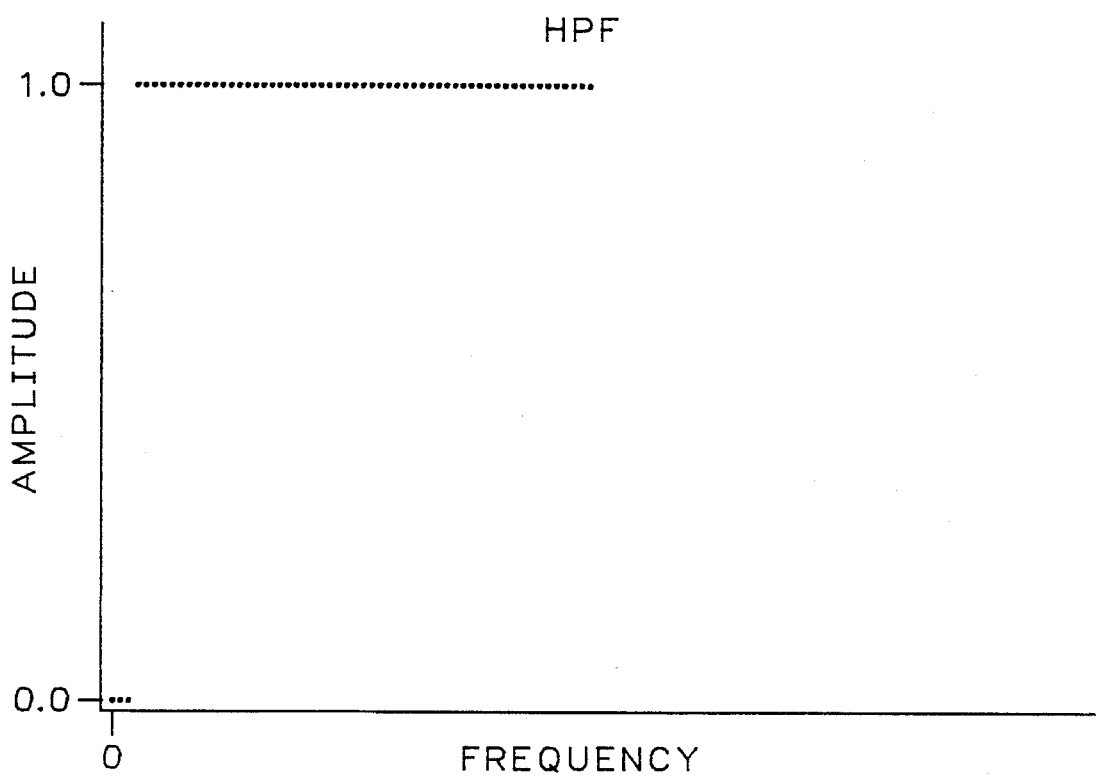
FIG. 9 is a graphic view of a highpass filter characteristic.
Figure 10:
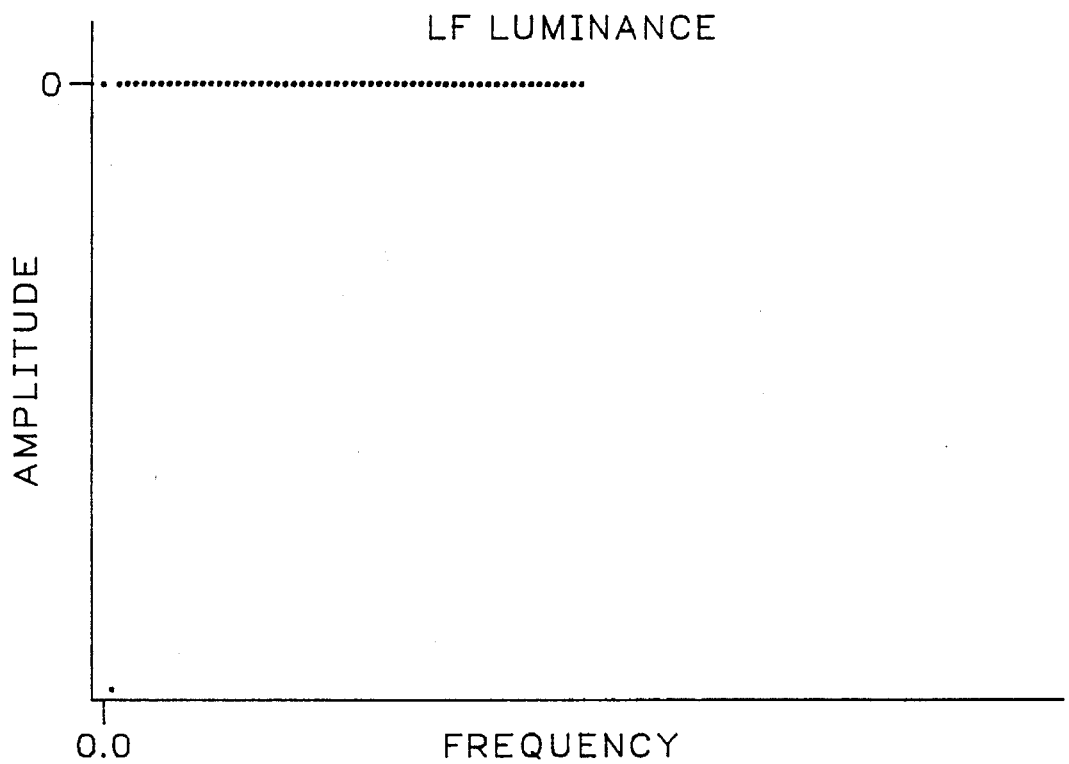
FIG. 10 is a graphic view of the lowpass filtered luminance component signal in the frequency domain.
Figure 11:
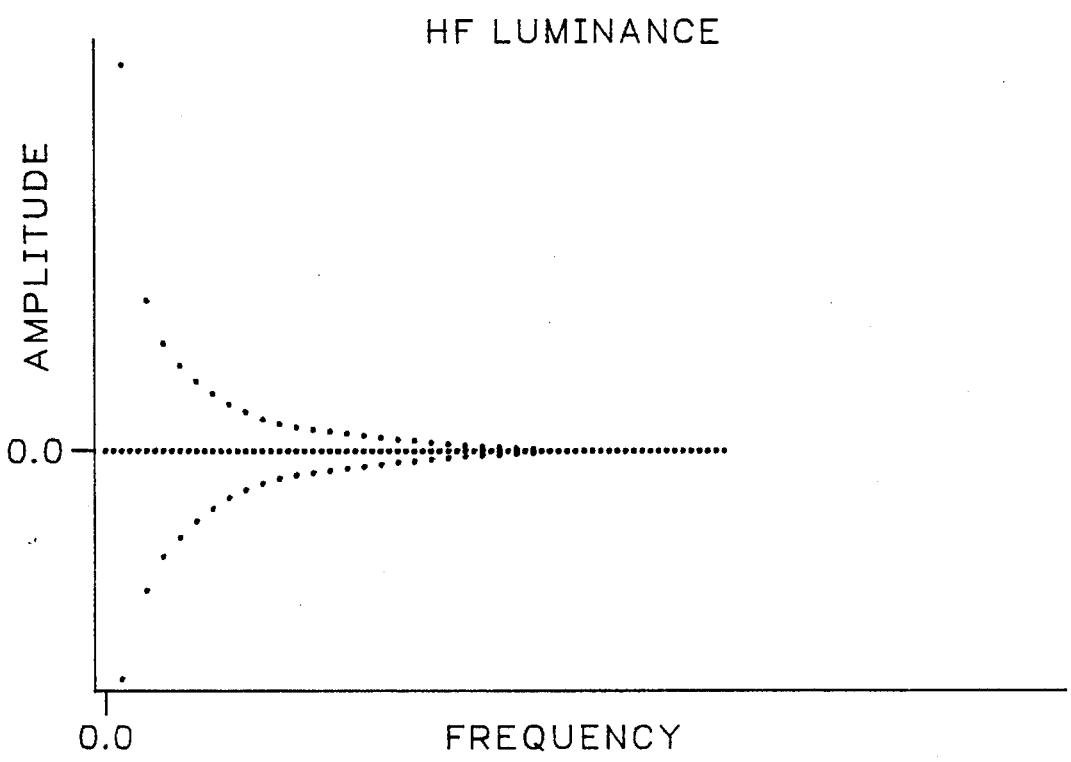
FIG. 11 is a graphic view of the highpass filtered luminance component signal in the frequency domain.

The spectra of these luminance and chrominance signals, shown in FIGS. 6 and 7, show that the luminance and chrominance signals have similar spectral shapes, but that the chrominance spectrum is missing the high frequency components. Particularly note in the luminance spectrum that spectral peaks exist out to higher frequencies than for the corresponding chrominance spectrum. The filter 12a, 12b characteristics are shown in FIGS. 8 and 9 to obtain low frequency and high frequency luminance components, as shown in FIGS. 10 and 11, from which a new chrominance signal is to be reconstructed. The low frequency filter 12a selects the low frequency portion of the luminance signal. The high frequency filter 12b selects the high frequency component of the luminance signal. Optional low frequency filters 14a, 16a assure that the chrominance component is bandwidth limited to be compatible with the luminance lowpass filtering. Since in this example the ratio of chrominance amplitude to luminance amplitude is 0.5, i.e., the outputs from the coefficient circuits 18, 20 are each 0.5, the high frequency luminance component is scaled by 0.5 before being added to the low frequency chrominance components by the summations circuits 28a, 30a at the inputs of the chrominance frequency to time domain converters 28, 30.

Figure 12:
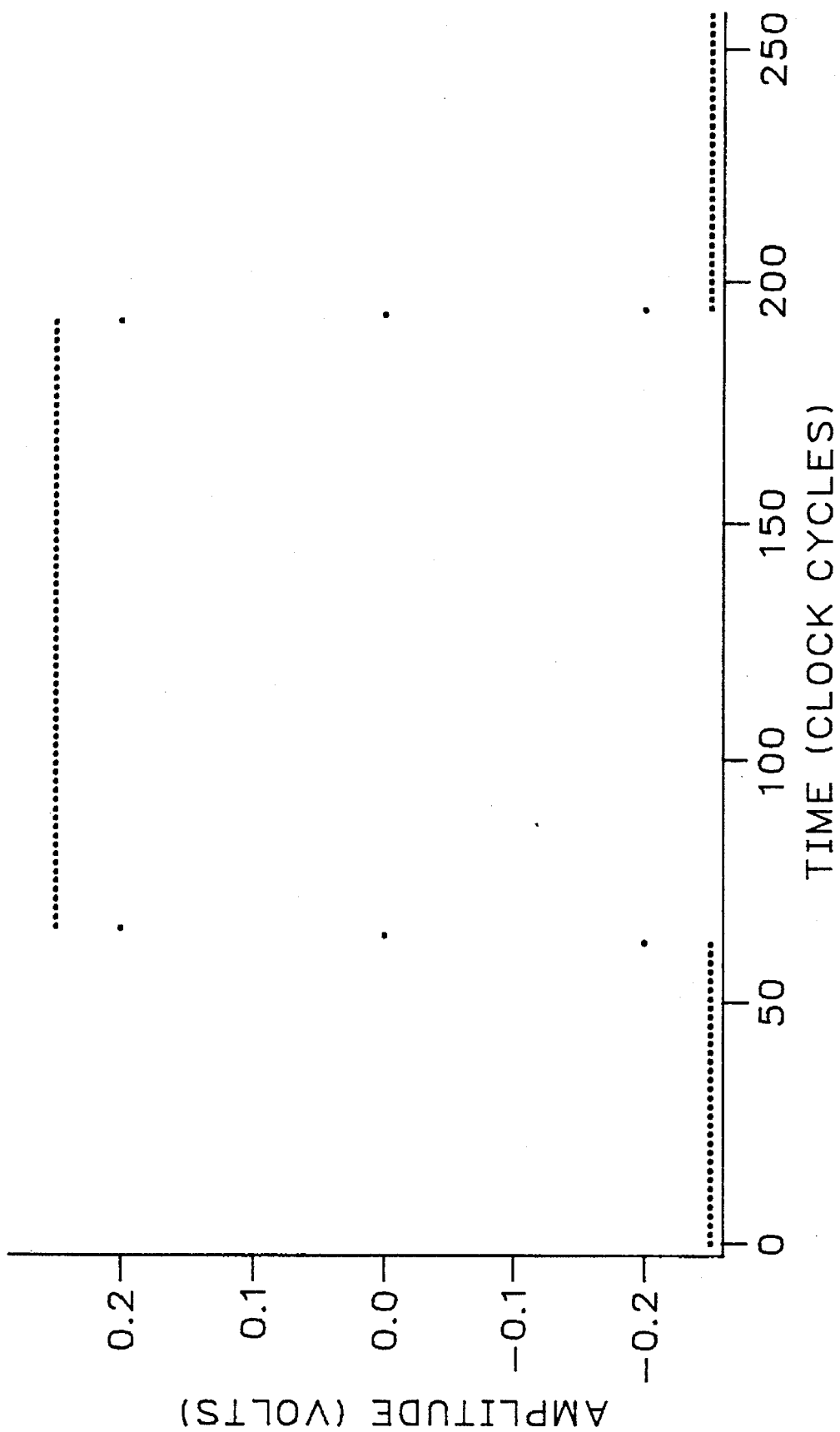
FIG. 12 is a graphic view of a reconstructed chrominance component waveform signal in the time domain according to the present invention.
Figure 13:
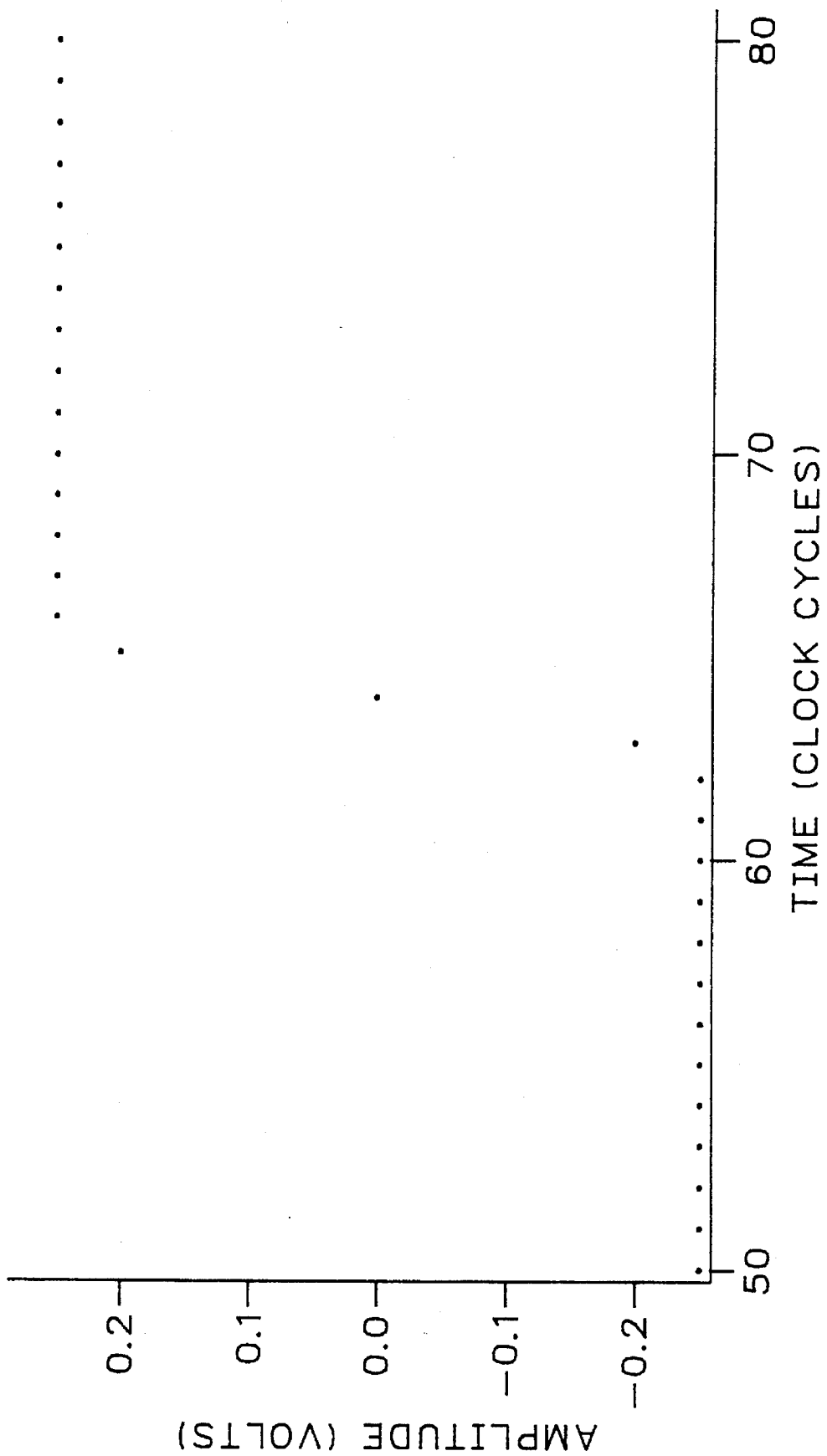
FIG. 13 is a graphic view of a portion of the reconstructed chrominance waveform signal of FIG. 12.

The true low frequency chrominance components from the time to frequency domain converters 14, 16 are added to the newly synthesized high frequency chrominance components to give a corrected chrominance spectrum. Taking the inverse FFT of the corrected chrominance spectrum gives the corrected chrominance waveform as shown in FIGS. 12 and 13 for comparison with FIGS. 3 and 5.

Although this example used a time symmetric waveform to make the explanation simpler, in actual application both outputs of the FFT are used. Alternately a transform with only real output components, such as a DCT, could be used. This illustration also used a 256 point transform, while actual applications use a substantially smaller transform with appropriate windowing. Further the transition corrector is not limited to horizontal transitions. Some television systems, such as PAL, may have reduced vertical chrominance bandwidth which may be corrected by applying the transition corrector to a vertical array of sample points. Also compressed video, such as 4:2:0 MPEG, may have both reduced horizontal and vertical resolution, so that the transition corrector is applied to both a vertical and horizontal array of sample points.

Thus the present invention provides a chrominance transition corrector, restoring chrominance transitions after they have been degraded by a limited bandwidth channel, by determining chrominance component correction coefficients in the frequency domain from the low frequency portions of the luminance and chrominance components, using the correction coefficients and the high frequency luminance portion to generate corrected high frequency chrominance portions, and then converting the components back to the time domain.

What is claimed is:

1. A chrominance transition corrector comprising:

first means for converting a luminance and two bandwidth limited chrominance components representing a video image from a time to a frequency domain, the converted luminance component being separated into a high and a low frequency portion;

means for determining a pair of chrominance correction coefficients from the low frequency luminance portion and the converted chrominance components;

means for generating from the correction coefficients and the high frequency luminance portion corrected high frequency chrominance components; and second means for converting the converted and corrected high frequency chrominance components to the time domain to produce corresponding chrominance output components, the chrominance output components being transition corrected.

2. The chrominance transition corrector as recited in claim 1 wherein the first converting means comprises:

a time to frequency domain converter selected from the group consisting of a fast Fourier transform converter, a discrete cosine transform converter and a discrete Fourier transform converter for converting the luminance component into the converted luminance component; and means for separating the converted luminance component into the high and low frequency portions.

3. The chrominance transition corrector as recited in claim 1 wherein the determining means comprises means for dividing each converted chrominance component by the low frequency portion of the converted luminance component to produce the correction coefficients.

4. The chrominance transition corrector as recited in claim 1 wherein the generating means comprises means for multiplying the high frequency portion of the converted luminance component by the correction coefficients to produce the corrected high frequency chrominance components.

5. The chrominance transition corrector as recited in claim 1 wherein the second converting means comprises:

means for combining the corrected high frequency chrominance components with the respective converted chrominance components to produce corrected chrominance components; and a frequency to time domain converters selected from the group consisting of an inverse fast Fourier transform converter, an inverse discrete cosine transform converter and an inverse discrete Fourier transform converter corresponding to the first converting means to produce from the corrected chrominance components the chrominance output components.

6. The chrominance transition corrector as recited in claim 1 further comprising means for lowpass filtering the converted chrominance components to correspond to the low frequency portion of the converted luminance component prior to input to the determining and second converting means.

\* \* \* \* \*